US008547376B2

(12) United States Patent
Reichard et al.

(10) Patent No.: US 8,547,376 B2
(45) Date of Patent: *Oct. 1, 2013

(54) THREE-DIMENSIONAL IMMERSIVE SYSTEM FOR REPRESENTING AN AUTOMATION CONTROL ENVIRONMENT

(75) Inventors: Douglas R. Reichard, Fairview, OH (US); Kevin G. Gordon, Annacis Island Delta (CA); Clifton H. Bromley, New Westminster (CA); Eric G. Dorgelo, Port Moody (CA); Shafin A. Virji, Vancouver (CA); Marc D. Semkow, Burnaby (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/208,817

(22) Filed: Aug. 12, 2011

(65) Prior Publication Data
US 2011/0298796 A1 Dec. 8, 2011

Related U.S. Application Data

(63) Continuation of application No. 12/862,877, filed on Aug. 25, 2010, now Pat. No. 8,009,165, which is a continuation of application No. 11/240,253, filed on Sep. 30, 2005, now Pat. No. 7,817,150.

(51) Int. Cl.
*G06T 15/00* (2011.01)
(52) U.S. Cl.
USPC ............... 345/419; 345/420; 700/83; 703/1; 703/21; 715/700; 715/705; 715/762

(58) Field of Classification Search
USPC ............... 345/419, 420; 700/83; 703/1, 21; 715/700, 705, 762
See application file for complete search history.

(56) References Cited

U.S. PATENT DOCUMENTS

| 4,958,297 A | 9/1990 | Hansen |
| 5,432,894 A | 7/1995 | Funaki |
| 5,461,709 A | 10/1995 | Brown |
| 5,574,841 A | 11/1996 | Thompson et al. |
| 5,588,098 A | 12/1996 | Chen et al. |
| 5,748,199 A | 5/1998 | Palm |
| 5,867,166 A | 2/1999 | Myhrvold et al. |
| 5,883,628 A | 3/1999 | Mullaly et al. |
| 5,936,612 A | 8/1999 | Wang |
| 6,148,100 A | 11/2000 | Anderson et al. |
| 6,212,441 B1 | 4/2001 | Hazama et al. |

(Continued)

OTHER PUBLICATIONS

Zhang et al, Web-Based Remote Manipulation in Advanced Manufacturing System, Mar. 2005, pp. 1-7.*

(Continued)

*Primary Examiner* — Phu K Nguyen
(74) *Attorney, Agent, or Firm* — Turocy & Watson, LLP; Alexander Kuszewski; John M. Miller

(57) ABSTRACT

A computer-implemented system for representing a production environment comprises a modeling module that creates a three-dimensional model of at least a portion of a production environment. The system also includes a view module that renders a graphical depiction of at least a portion of the three-dimensional model from a reference point that is based at least in part upon a location. Methods of using the system are also provided.

20 Claims, 10 Drawing Sheets

(56) References Cited

U.S. PATENT DOCUMENTS

| | | |
|---|---|---|
| 6,268,853 B1 | 7/2001 | Hoskins et al. |
| 6,282,455 B1 | 8/2001 | Engdahl |
| 6,289,299 B1 | 9/2001 | Daniel, Jr. et al. |
| 6,326,964 B1 | 12/2001 | Snyder et al. |
| 6,330,356 B1 | 12/2001 | Sundareswaran et al. |
| 6,484,101 B1 | 11/2002 | Lucas et al. |
| 6,579,324 B1 | 6/2003 | Lowry et al. |
| 6,671,651 B2 | 12/2003 | Goodwin et al. |
| 6,760,030 B2 | 7/2004 | Hiroike et al. |
| 6,919,893 B2 | 7/2005 | Tobita et al. |
| 6,962,289 B2 | 11/2005 | Vatan et al. |
| 6,983,227 B1 | 1/2006 | Thalhammer-Reyero |
| 7,272,815 B1 | 9/2007 | Eldridge et al. |
| 7,499,157 B2 | 3/2009 | Nishiyama et al. |
| 7,817,150 B2 | 10/2010 | Reichard et al. |
| 8,009,165 B2 * | 8/2011 | Reichard et al. ............... 345/419 |
| 2002/0029134 A1 | 3/2002 | Friedrich et al. |
| 2002/0091728 A1 | 7/2002 | Kjaer et al. |
| 2002/0120921 A1 | 8/2002 | Coburn et al. |
| 2002/0130859 A1 | 9/2002 | Perry et al. |
| 2003/0055612 A1 | 3/2003 | Amakai et al. |
| 2004/0136567 A1 | 7/2004 | Billinghurst et al. |
| 2005/0071498 A1 | 3/2005 | Farchmin |
| 2005/0166190 A1 | 7/2005 | Hoefler et al. |

OTHER PUBLICATIONS

Cobb, et al., Simultaneous Engineering and Human Factors. International Journal of Industrial Ergonomics; vol. 16, Issues 4-6, Oct. 1995. pp. 411-425.

Whitman, et al. Teaching Process Design Using Virtual Reality, Proceedings of the 2002 American Society for Engineering Education Annual Conference & Exposition, 2002. pp. 1-11.

* cited by examiner

THREE-DIMENSIONAL IMMERSIVE SYSTEM FOR REPRESENTING AN AUTOMATION CONTROL ENVIRONMENT

CROSS REFERENCE TO RELATED APPLICATIONS

This application is a Continuation of U.S. patent application Ser. No. 12/862,877, filed Aug. 25, 2010, and entitled "THREE-DIMENSIONAL IMMERSIVE SYSTEM FOR REPRESENTING AN AUTOMATION CONTROL ENVIRONMENT", which is a Continuation of U.S. patent application Ser. No. 11/240,253 (U.S. Pat. No. 7,817,150), filed Sep. 30, 2005, entitled "THREE-DIMENSIONAL IMMERSIVE SYSTEM FOR REPRESENTING AN AUTOMATION CONTROL ENVIRONMENT." The entireties of these applications are incorporated herein by reference.

TECHNICAL FIELD

The disclosed and described components and methods relate generally to the field of human-machine interfaces. Specifically, the disclosed and described components and methods relate to graphical user interfaces for automated production control environments.

BACKGROUND

Production environments, including multi-stage manufacturing environments, are often automated using computer-controlled equipment. Such computer-controlled equipment can be used to perform one or more steps in a manufacturing process for one or more products. Commonly, pieces of manufacturing equipment such as presses, drills, and lathes, among others, can be used by multiple operators or users in the manufacture of more than one product. These pieces of equipment can often perform multiple sub-steps under the control of a computer and can also be included as part of a complete industrial control system.

A human operator or controller can typically access functions of a computer running an industrial automation or control system through the use of a human-machine interface (HMI). An HMI, or simply a user interface (UI), can be important to the successful operation and maintenance of industrial automation devices such as control systems and associated equipment or machinery. User interfaces generally provide the essential communication link between operators and automation devices. This link allows operators to, among other things, setup and control devices and receive feedback by monitoring device status and health during operation. Without such user interfaces, achieving high-level industrial automation would be difficult, if not impossible.

One desirable property of an HMI is ease of use. A well-designed HMI can make operation of complex machinery easier and more intuitive. Graphical HMIs are commonly favored to present data to users in an easily understandable manner. However, such graphical systems can require great amounts of processing resources simply to create the graphical components of the HMI. Use of these processing resources for graphics-related tasks prevents use of these relatively scarce processing resources for tasks directly related to monitoring and control of machinery and equipment. Current HMIs fail to provide computationally efficient ways to present monitoring and control information to users in a graphical format.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

A three-dimensional user interface displays information regarding at least a portion of an automated manufacturing or production environment. The automated manufacturing or production environment is modeled using cells. Each cell can include a portion of the modeled environment. A field of view is calculated from a reference point within a model and cells that are at least partially included in the field of view are loaded for processing.

A three-dimensional HMI for automated production environments renders objects within a field of view with regard to a context. The field of view defines a portion of a model of the automated production environment that is to be rendered. The context provides information that can be used to filter objects from a rendering or to modify renderings such as by color-coding, animating, highlighting, or otherwise graphically representing rendered objects.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

DETAILED DESCRIPTION

Figure 1:
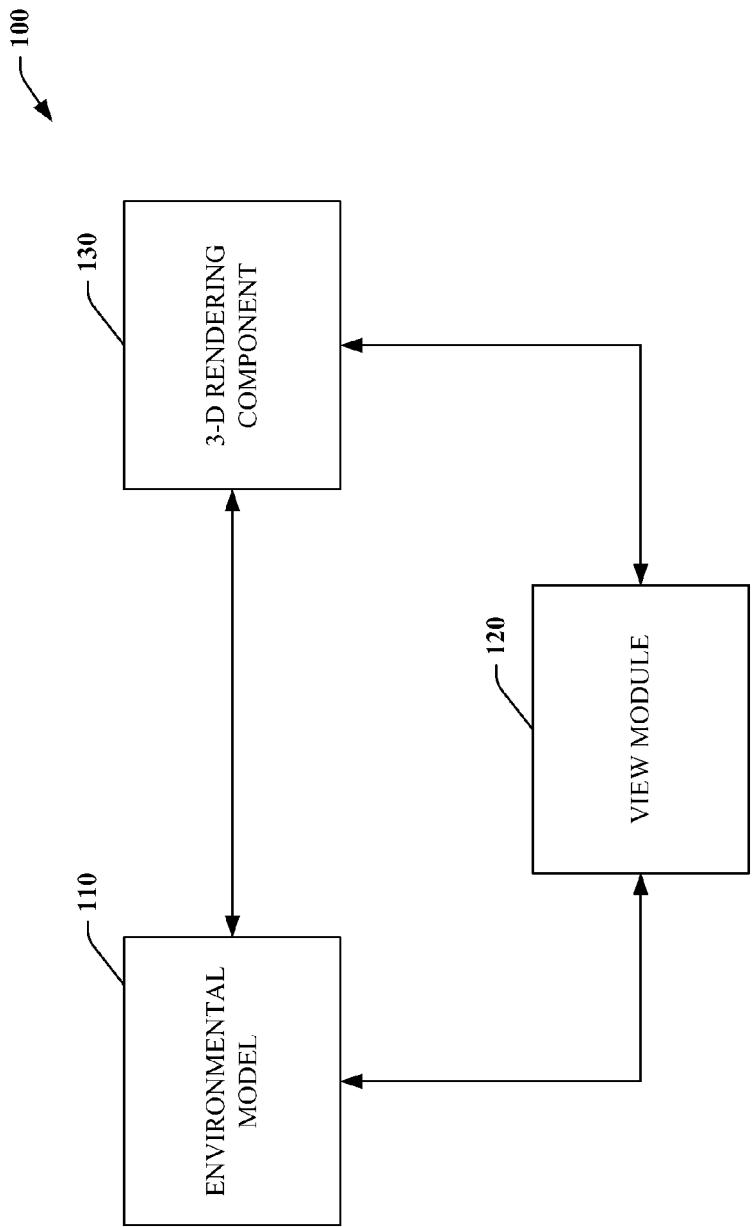
FIG. 1 is a system block diagram of a three-dimensional HMI system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

FIG. 1 is a system block diagram of a three-dimensional HMI system 100. The three-dimensional HMI system 100 can be used to provide a three-dimensional graphical user interface for an automation control system. In particular, the graphical user interface can be based upon a model of a production environment that can include various types of computer-controlled machinery.

The three-dimensional HMI system 100 includes an environmental model 110. The environmental model 110 can be a data structure or other computer-implemented data structure that models an actual or proposed production or manufacturing environment. Such a model can include models or representations of machines that are part of production or manufacturing environment as well as control and monitoring information and parameters for such machines. These models or representations of machines can also include models or representations of operational controls for such machines. Additionally, the environmental model 110 can include representations of interrelationships between or among machines or interrelationships between or among machines and operators of those machines. In general, the environmental model 110 can include representations of a complete factory production environment, including physical facilities and layouts of production or manufacturing lines.

The environmental model 110 can be subdivided into segments or cells. Each cell can include a portion or subset of the items or machines represented in the environmental model 110. Cells can be constructed so that each cell covers a discrete or exclusive portion of the environmental model. Alternatively, cells can be constructed such that two or more cells can overlap to include the same portion of the environmental model 110. Certain examples presented in this disclosure depict or describe cells that do not overlap. Those of ordinary skill in the art will recognize from reading this disclosure that such examples can be readily adapted for use with overlapping cells.

A view module 120 can create a view into the environmental model 110. This view can be used to define a subset of items included in the environmental model 110. The subset can be created in a variety of ways depending upon specific implementation details of the environmental model 110. For example, a view can be defined as a specific subset or region of the environmental model 110 by picking an initial point within the environmental model 110 corresponding to a point in the production environment represented by the environmental model 110 and defining a region with reference to that point. To define a region to be included in a view, a variety of approaches can be used. For example, the initial point chosen can be used as a center point of a circular region. Alternatively, the initial point can be used as one point in a triangular region. Regions of other shapes, regular or irregular, can also be defined.

A region to be included in a view can also be based upon cells. A region of a view as described above can be laid over a cell topology and each cell or portion of a cell that is within the region of the view can be included within the view. When this approach is used, the region of the view initially defined can be modified or expanded to include all of each cell that is at least partially included in a view region overlaid on such a cell.

A three-dimensional rendering component 130 can create three-dimensional graphical depictions of items included in the environmental model 110 that are within a view defined by the view module 120. Such graphical depictions can include representations of machines, representations of controls of such machines, graphical depictions of relationships such as connecting lines, boxes containing data or metadata regarding operational parameters of machines, and representations of physical surroundings such as floors or walls, among other things. In particular, graphical depictions can be animated, color-coded, highlighted, or otherwise varied or modified to emphasize certain components, convey information about components or relationships pertaining to a component, or for any other appropriate reason.

In operation, the HMI system 100 can function as follows. An environmental model 110 provides a computer-usable representation of a manufacturing or production environment, including items located or included in that manufacturing or production environment. The view module 120 creates a view into the environmental model that provides access to a portion of the whole environmental model 110. The three-dimensional rendering component 130 creates a three-dimensional graphical depiction of items in the view created by the view module 120 and renders this depiction for a user. Portions of the three-dimensional graphical depiction are animated or otherwise graphically altered for emphasis as desired or deemed appropriate for a specific implementation.

Figure 2:
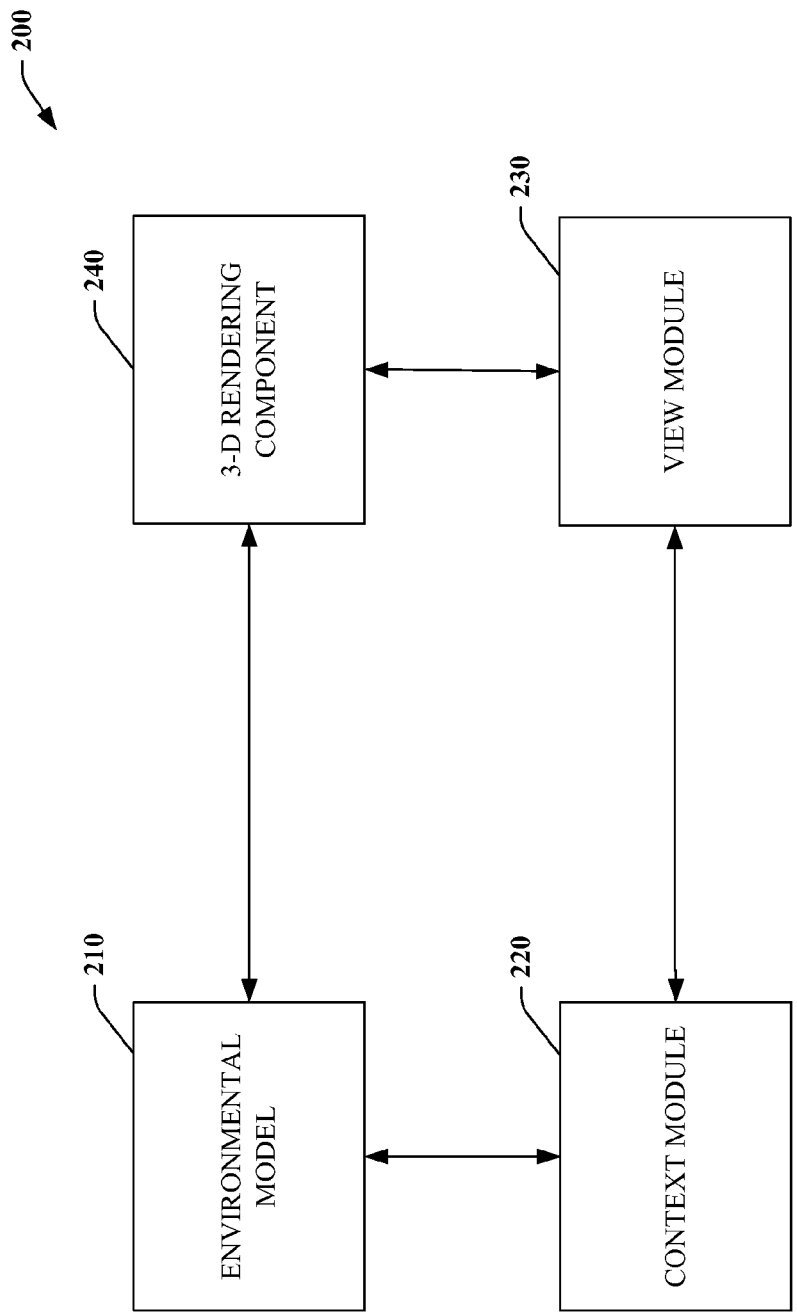
FIG. 2 is a system block diagram of a three-dimensional HMI system.

FIG. 2 is a system block diagram of a three-dimensional HMI system 200. The HMI system 200 can be used to access a production control system or various components of such a system. In particular, the HMI system 200 can be used to provide a graphical interface that is customized for a user by taking information about a user context into account when presenting the interface to the user.

The HMI system 200 includes an environmental model 210. This environmental model 210 can include computer-usable representations of items, machines, equipment, and other things in a production environment. In particular, the environmental model 210 can be implemented as the previously described environmental model 110 of FIG. 1. Alternatively, some other computer-usable model of a manufacturing or production environment can be used as the environmental model 210.

A context module 220 can provide a context to be applied for use with the environmental model 210. The context can be a description of tasks that can be expected to be performed as part of a production or manufacturing process for a product. The context can also be a description of tasks, operations or machines that a user can be expected to perform or use when participating in a production process. Other appropriate descriptions can be created.

Such context descriptions can be used as filters to apply to the environmental model 210 so that items of the environmental model 210 that are included or associated with a context description can be displayed by a view module 230. For example, a context can describe a subset of particular machines out of all available machines in an environment that a user can be expected to use as part of a process to produce a specific item. When the context is applied to the environmental model 210, only those machines in the subset will be displayed. Alternatively, machines in the context can be highlighted to distinguish such machines from others displayed in the environmental model 210. Similarly, relationships between a user and a piece of equipment or between or among pieces of equipment or users, can be graphically displayed as connecting lines or in some other appropriate fashion like color-coding, among others.

Still further yet, it should be appreciated that context can pertain to a user's role in a production environment. Role can be related to one or more of a user's position, certifications, and security level. In addition, a user's role can change at different times of the day. For example, if a user's role at a particular time is defined as a machine operator, current operating parameters of an automation device such as a pump (e.g., on/off, flow rate, operational alarms . . . ) be presented or displayed. Alternatively, if the user role corresponds to maintenance engineer, information regarding when the same pump was last serviced and characteristics such as vibration, can be provided that indicate whether a device needs to be serviced or replaced.

The view module 230 can define a view to be applied to the environmental model 210. This view can be implemented as previously described in conjunction with FIG. 1 or in another suitable manner. The view module 230 can provide a view definition to a three-dimensional rendering component 240. The three-dimensional rendering component 240 can use a context from the context module 220 and the view from the view module 230 to create a three-dimensional graphical depiction of a portion of the environmental model 210. Items rendered in the graphical depiction can be limited, highlighted, or otherwise manipulated or modified in accordance with parameters of the view and the context.

In operation, the HMI system 200 can function as follows. The environmental model 210 provides a representation of a production or manufacturing environment. The context module 220 provides a context to be applied to the environmental module 220. The view module 230 defines a view to be applied to the environmental model 210. The three-dimensional rendering component 240 then uses the view to obtain a subset of items included in the environmental model 210 that are also within a region defined by the view. The three-dimensional rendering component 240 then applies the context to the view to filter items in the view for rendering as three-dimensional graphics for a user.

Figure 3:
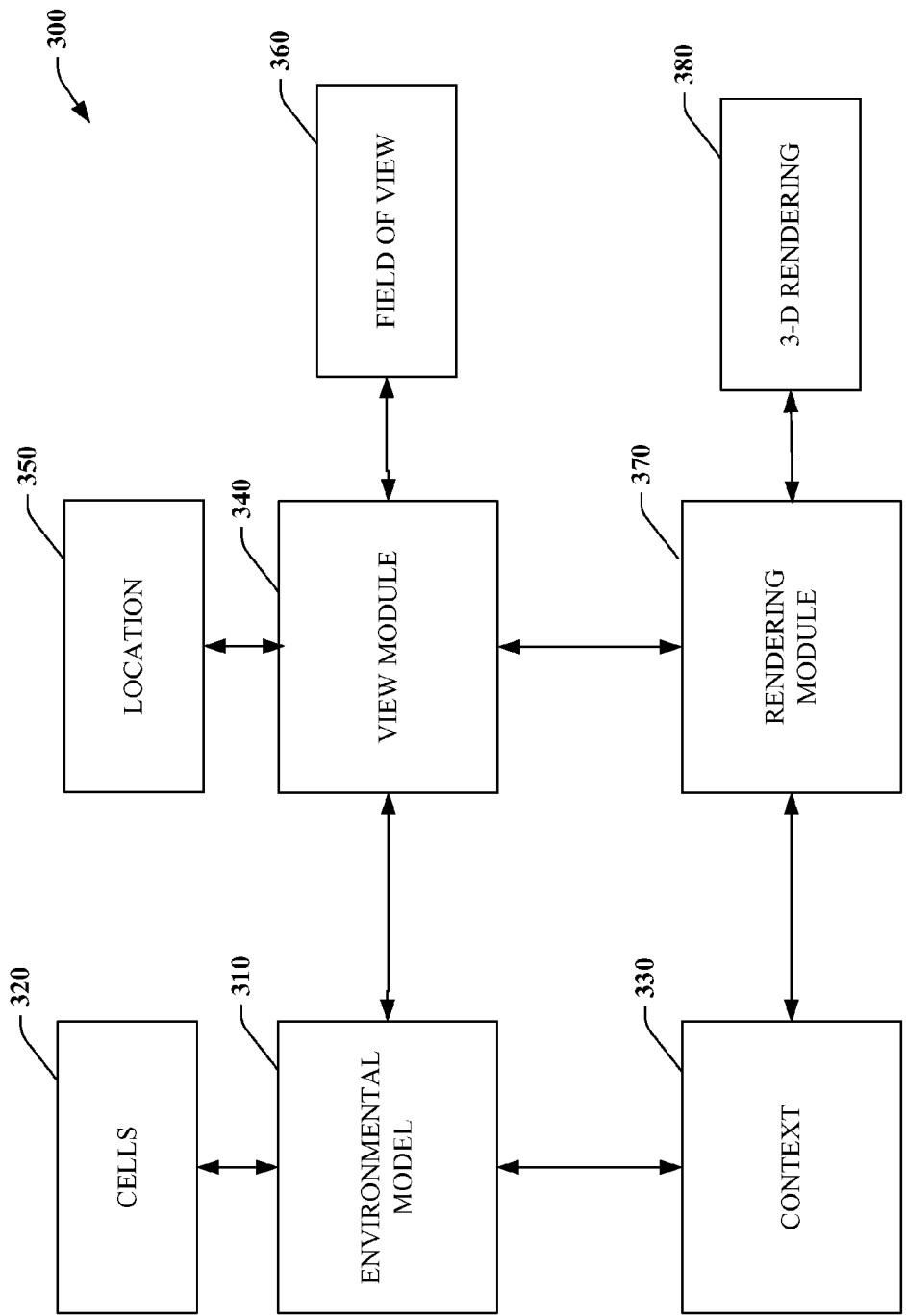
FIG. 3 is a system block diagram of a three-dimensional HMI system.

FIG. 3 is a system block diagram of an HMI system 300. The HMI system 300 can be used to provide a three-dimensional representation of an automated production environment. In particular, the HMI system 300 can create a three-dimensional representation that is customized for a specific context and based upon a subset of cells that comprise a model of the automated production environment.

The HMI system 300 includes an environmental model 310. The environmental model 310 can include models of items or objects of a manufacturing or production environment such as components of a physical plant, production or manufacturing machines, and monitors or controls of such production or manufacturing machines, among others. Those of ordinary skill in the art will appreciate from reading this disclosure that such included models of items or objects of a manufacturing or production environment can be constructed as separate or independent models that can be linked or otherwise associated with a general model of a physical plant or production environment. In such an implementation, linked or associated models can be described as included in a group or set of models and treated as a single model. Individual components of a single model can be changed by changing linkages or associations between or among models. Additionally or alternatively, a set of linked or associated models can be defined as a single group by defining a subset of all available models. Specifics of a defined subset will vary according to a specific implementation but, among other methods, can be constructed by creating a list of linked models using a unique identifier for each model.

The environmental model 310 can be comprised of a plurality of cells 320. Each of the cells 320 can define a portion or subset of the environmental model 310. The cells 320 can be mutually exclusive or can overlap. In particular, each of the cells 320 can be treated as a discrete portion of the environmental model 310 providing a mechanism by which data of the environmental model 310 can be accessed, loaded into memory, or processed without having to access, load into memory, or process the entire environmental model 310. Such an approach can have the benefit of reducing demands on computational resources.

A context 330 provides information that can be used to adjust a rendering of the environmental model 310. Specifically, information in the context 330 can include types of information previously disclosed or described in conjunction with other figures, among other types. The context 330 can be applied to the environmental model 310 to filter, highlight, or otherwise selectively modify visibility or appearance of items included in, or linked or associated with, the environmental model 310. In particular, the context 330 can be used as previously disclosed or described in conjunction with other figures.

A view module 340 can impose a view on the environmental model 310. The view module 340 can be implemented in a similar fashion as other view modules previously disclosed or described in conjunction with previous figures. Alternatively, another suitable view module can be used as the view module 340. The view module 340 can use a location 350 to create a field of view 360. The location 350 can be a point of reference in the environmental model 310 that corresponds to a physical location in a production or manufacturing facility or a position in a production or manufacturing line, among other things. The field of view 360 can include the location 350 as a starting point for construction of a designated region that corresponds to a region in a production or manufacturing facility or in a production or manufacturing line, among other things. For example, the location 350 can be the vertex of an angle having rays that extend for a specified length. An area between the two rays of the angle can define the field of view. Other areas can also be defined by calculating different areas that can be based upon geometric shapes or topology of an area modeled by the environmental model 310, among others.

The field of view 360 can be imposed upon the environmental model 310 to limit access to, or visibility of items within the field of view 360. A rendering module 370 can use the field of view 360 and the context 330 to create a three-dimensional rendering 380. The three-dimensional rendering 380 can be a graphical depiction of items within the field of view 360 within the context 330. Rendered items can include metadata associated with modeled items within the field of view.

In operation, the HMI system 300 can function as follows. The view module 340 uses the location 350 to calculate the field of view 360. The view module 340 applies the field of view 360 to the environmental model 310. Each of the cells 320 of the environmental model 310 that are at least partially overlaid by the field of view 360 are loaded into memory along with any included, linked, or associated models of items of the environmental model 310.

The rendering module 370 uses the field of view 360 and the context 330 to determine whether to render an item. Specifically, those items that are within the field of view 360 and included in the context 330 are rendered. Rendered items are included in the three-dimensional rendering 380. Such rendered items are color-coded, animated, highlighted, or otherwise displayed in accordance with pre-selected criteria that correspond to specific pieces of information from the context 330 such as identity or functions of users, among others.

Figure 4:
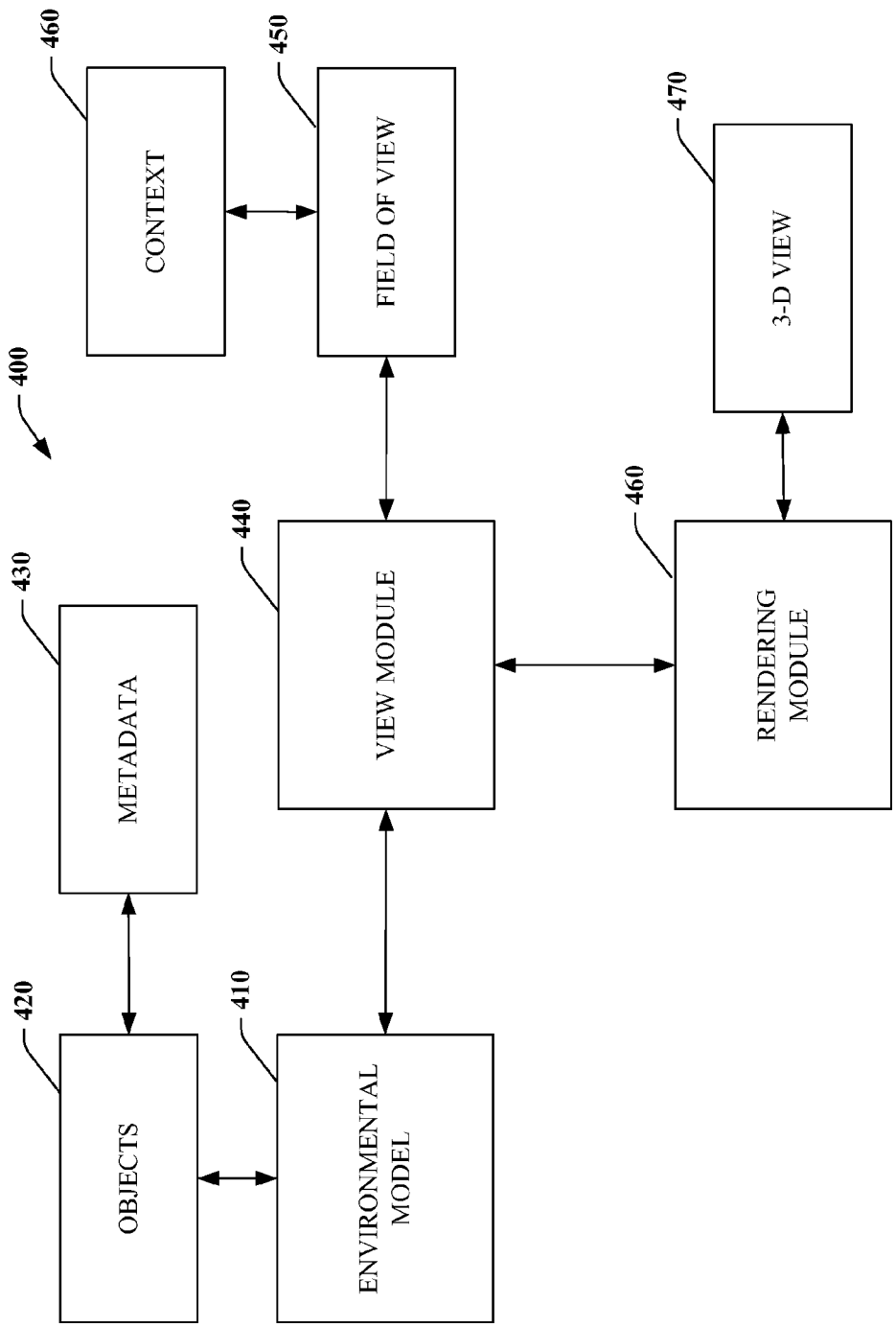
FIG. 4 is a system block diagram of a three-dimensional HMI system.

FIG. 4 is a system block diagram of an HMI system 400. The HMI system 400 can be used to create a three-dimensional graphical environment for an automated control system used in a factory or other production or manufacturing environment. Specifically, the HMI system 400 can be used to display metadata associated with modeled objects within a specified field of view.

The HMI system 400 includes an environmental model 410. The environmental model 410 can be implemented in any of the ways previously disclosed or described in conjunction with other figures. Additionally or alternatively, another suitable implementation for the environmental model 410 can be used. Specifically contemplated implementations include comprehensive data structures or object-oriented models that can represent an entire factory environment, groups of linked or associated data structures or objects, or simpler models that represent portions of production lines or even single machines or portions of a machine.

The environmental model 410 can include a plurality of objects 420. Each of the objects 420 can have metadata 430 that is associated with such an object. Information included in the metadata 430 can include configuration parameters of machines or operational information of such machines, among other things. Specifically, the information included in the metadata 430 can be information that usually can be displayed on control or monitoring devices for a specific piece of equipment.

A view module 440 can be implemented and can create a field of view 450 in a similar manner to other view modules and fields of view, respectively that have been previously disclosed or described in conjunction with other figures. A rendering module 450 can use a context 460 that can be similar to other contexts previously disclosed and described herein along with the field of view 450 to create a three-dimensional view 470 that includes graphical depictions of appropriate metadata 430 associated with each of the objects 420 within the field of view 450 and context 460.

In operation, the HMI system 400 can function as follows. The view module 440 creates a field of view 450 to be applied to the environmental model 410. The rendering module 450 uses the field of view 450 and context 460 to determine which of the objects 420 to display as part of the three-dimensional view 470. For each of such objects 420, the rendering module 450 obtains the metadata 430 associated with that object and presents information from the metadata 430 as part of the rendered three-dimensional view 470. Details of rendered objects, such as color, animation, and the like, are consistent with display parameters set in accordance with the context 460. For example, rendered objects that correspond to currently-operating machinery can be animated. Additionally or alternatively, machines operated by a specified user can be rendered in a specified color corresponding to that user. Other display options are also possible.

Figure 5:
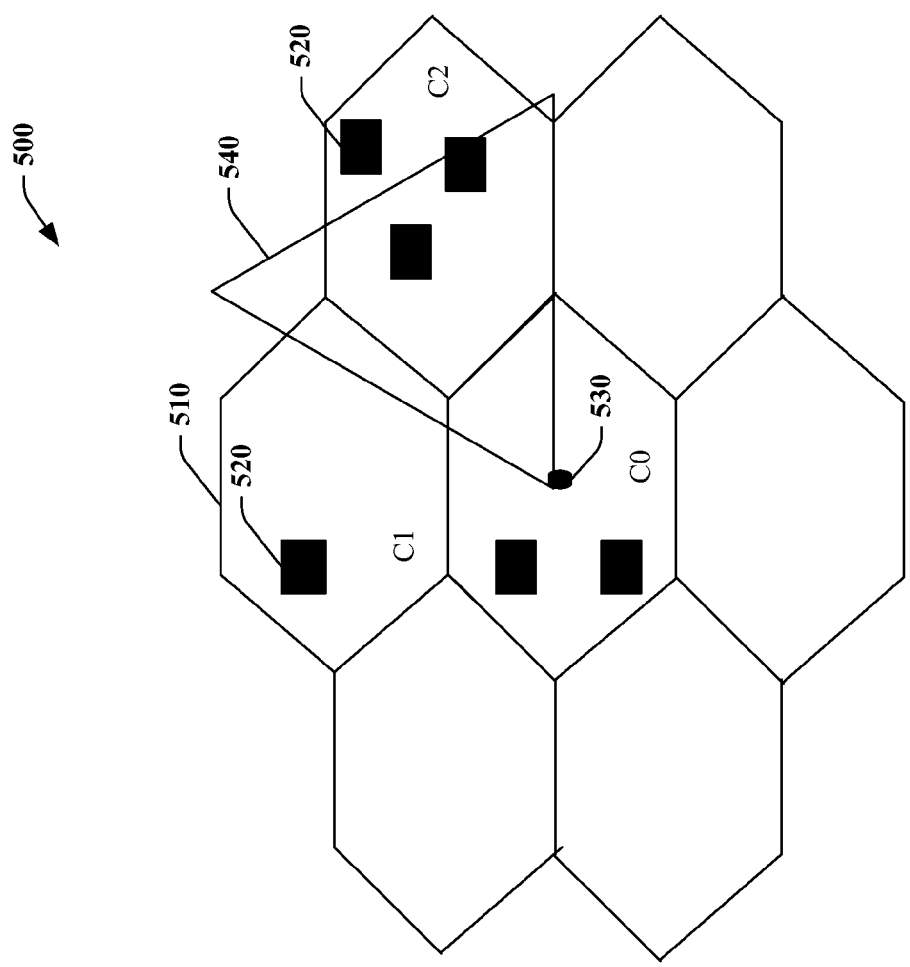
FIG. 5 is a block diagram of a model of a production environment.

FIG. 5 is a block diagram of a model of a production environment 500. The model of the production environment 500 can be used as at least part of a basis for a three-dimensional graphical rendering of a production or manufacturing environment. Specifically, the model of the production environment 500 provides a means by which the model can be accessed and used in segments or portions as opposed to storing the entire model in a manner in which the entire model is used for rendering of a graphical user interface associated with the model of the production environment 500.

The model of the production environment 500 can include a plurality of cells 510. Each of the plurality of cells 510 can be mapped to a portion of the entirety of the model of the production environment 500. As depicted, each of the plurality of cells 510 is mutually exclusive in the sense that no two cells correspond to the same modeled area or object. However, those of ordinary skill in the art will recognize from reading this disclosure that cells can be created to overlap. Such overlap can be desirable in circumstances where some level of data redundancy is required or desires, as well as in other circumstances.

Each of the plurality of cells 510 can include one or more modeled objects 520. As previously discussed, such modeled objects can be included in a variety of ways such as by encapsulation in an object-oriented representation or can merely be linked or associated as with some possible data structure-based implementations. Each of the modeled objects 520 can represent an item in a manufacturing or production environment, such as a machine or a control panel or a physical environment member such as a wall or doorway, among others.

A reference point 530 can correspond to a physical location in a manufacturing facility or along a production line. Although depicted as a vertex of a field of view 540, the reference point does not necessarily have to be part of the field of view 540. For example, the parameters of the field of view 540 can be calculated using an offset from the reference point 530. Other approaches can also be employed.

Cells $C_0$, $C_1$, and $C_2$ can each be partially overlaid by the field of view 540. In a system where a three-dimensional rendering of items in the field of view 540 is to be created, only these affected cells need be loaded into memory for processing instead of having to load the entirety of the model of the production environment 500. In this manner, all data from the model of the production environment 500 needed to create a three-dimensional rendering of items in the field of view 540 is readily available to the rendering system while reducing an amount of unneeded data that is loaded.

Figure 6:
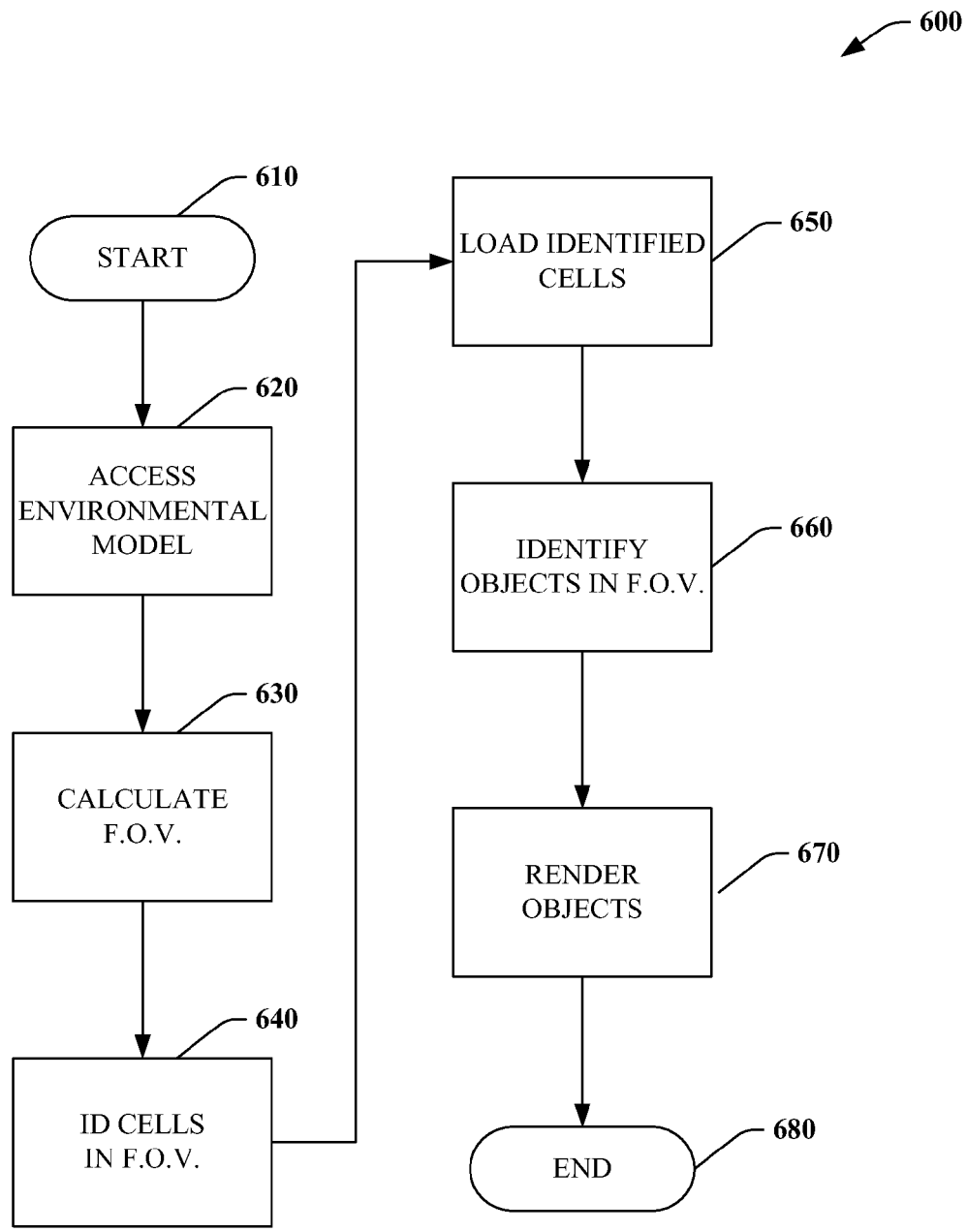
FIG. 6 is a flow diagram depicting a general processing flow of a method that can be employed in accordance with components that are disclosed and described herein.

FIG. 6 is a flow diagram of a method 600 that can be employed with components that previously were disclosed or described herein. The method 600 can be used to load data necessary to create a three-dimensional rendering of a modeled manufacturing or production environment. Specifically, the method 600 can be used to load a set of data that is less than all data in a model of the manufacturing or production environment.

Execution of the method 600 begins at START block 610 and continues to process block 620. At process block 620, a model of a production environment is accessed. Processing continues to process block 630 where a field of view to be applied to the model is calculated using an appropriate technique, such as one of the techniques previously disclosed or described in conjunction with earlier figures. At process block 640, cells of the model of the production environment that are at least partially within the field of view are identified. Identified cells are loaded into memory for use in processing at process block 650.

Processing of the method 600 continues at process block 660 where objects in loaded cells that are also within the field of view are identified. At process block 670, the identified objects are rendered for viewing in a three-dimensional graphical user interface. Processing of the method 600 concludes at END block 680.

Figure 7:
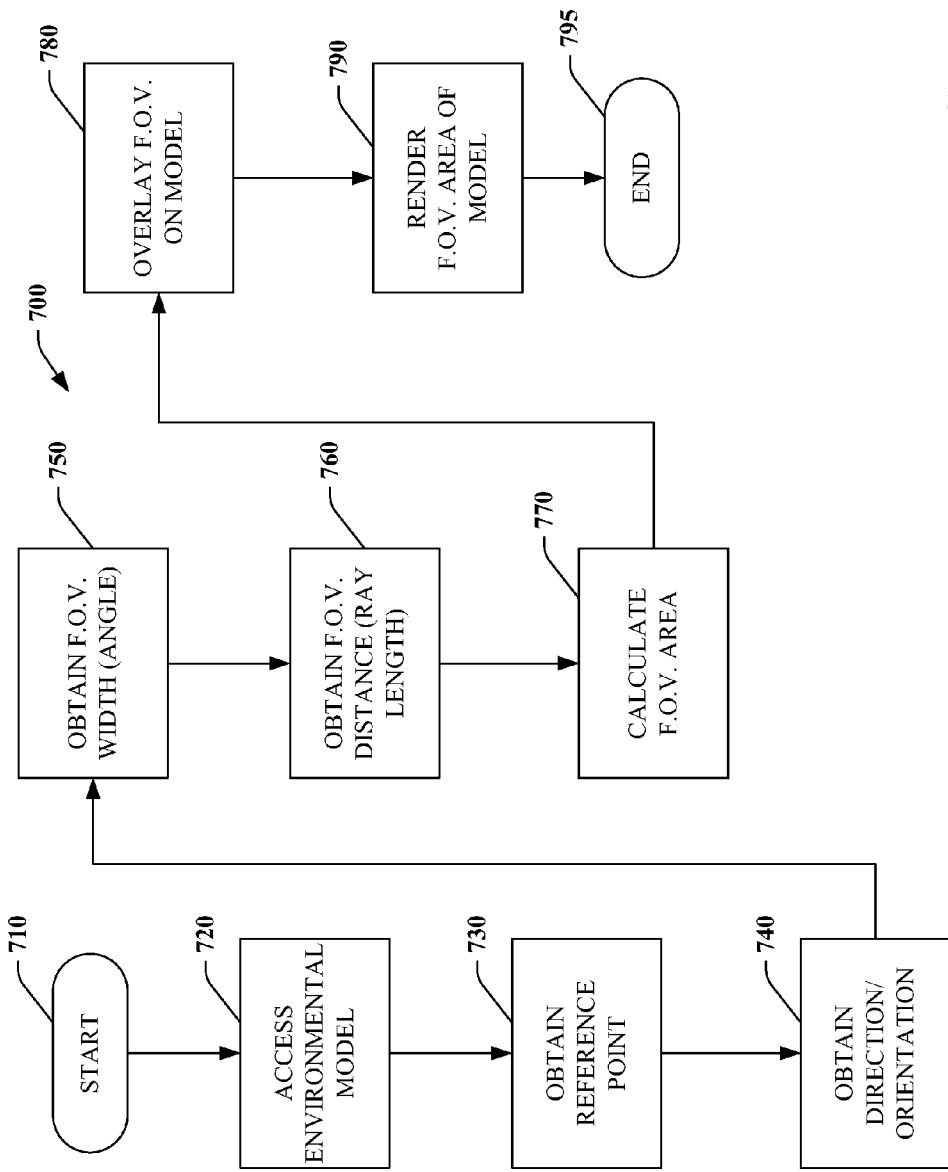
FIG. 7 is a flow diagram depicting a general processing flow of a method that can be employed in accordance with components that are disclosed and described herein.

FIG. 7 is a flow diagram of a method 700 that can be employed with components that previously were disclosed or described herein. The method 700 can be used to obtain data necessary to create a three-dimensional rendering of a portion of a modeled manufacturing or production environment. Specifically, the method 700 can be used to create a field of view.

Execution of the method 700 begins at START block 710 and continues to process block 720. At process block 720, a model of a production environment is accessed. Processing continues to process block 730 where a reference point within the model is obtained. At process block 740, a direction or orientation of the field of view to be calculated is obtained. In this specific example, the field of view is generally triangular with the reference point being a vertex of an angle having two rays extending from the reference point to create two legs of the generally triangular field of view. A measurement of the angle defined by the two rays is obtained at process block 750.

Processing of the method 700 continues at process block 760 where lengths of the two rays are obtained. At process block 770, an area formed by connecting the ends of the two rays that are opposite the reference point is calculated. At process block 780, the calculated field of view area is overlaid on the model of the production environment. Items within the field of view are rendered at process block 790. Processing of the method 700 concludes at END block 795.

Figure 8:
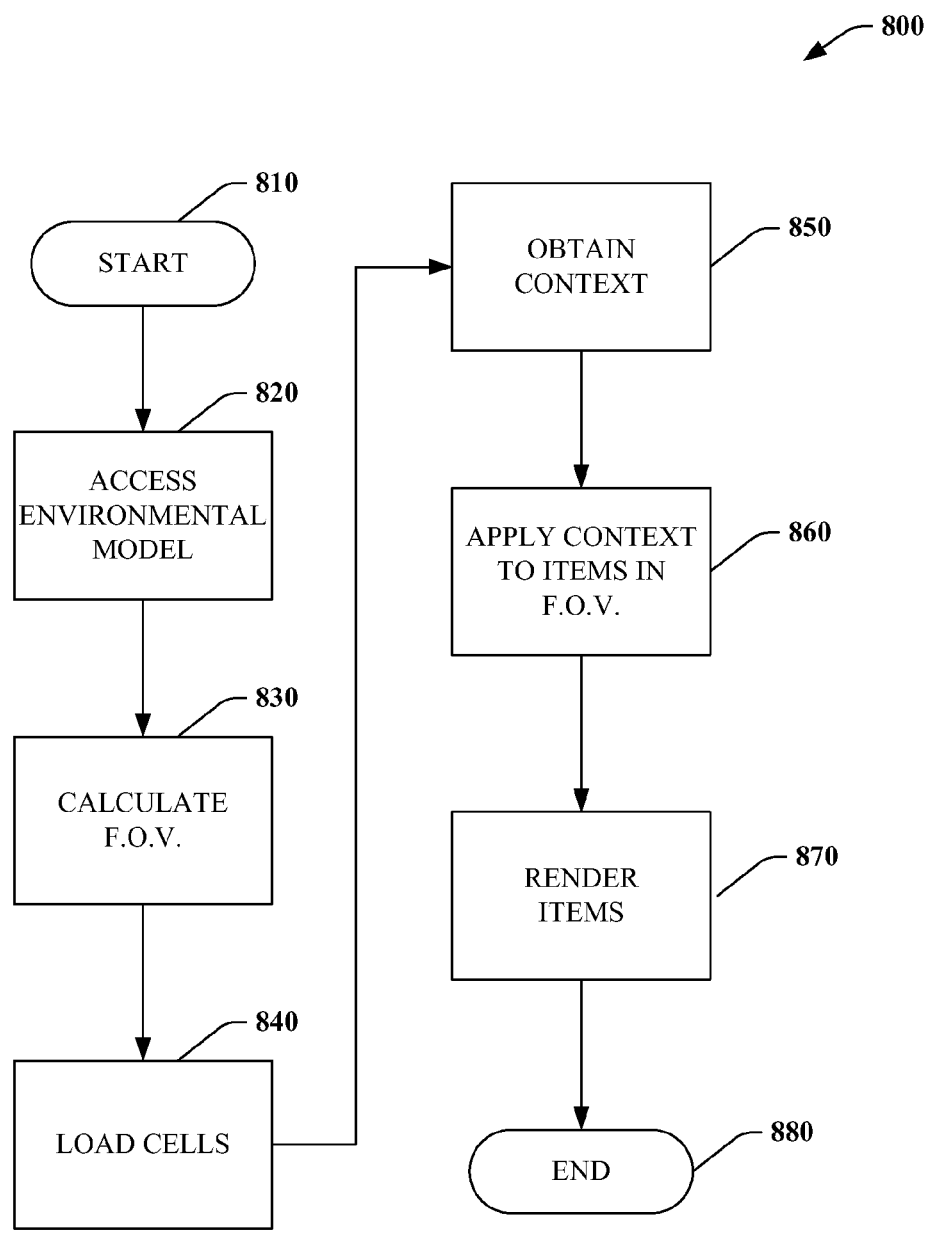
FIG. 8 is a flow diagram of a general processing flow of a method that can be employed in accordance with components that are disclosed and described herein.

FIG. 8 is a flow diagram of a method 800 that can be employed with components that previously were disclosed or described herein. The method 800 can be used to create a three-dimensional rendering of a modeled manufacturing or production environment. Specifically, the method 800 can be used to render items that are pertinent to a predefined context.

Execution of the method 800 begins at START block 810 and continues to process block 820. At process block 820, a model of a production environment is accessed. Processing continues to process block 830 where a field of view to be applied to the model is calculated using an appropriate technique, such as one of the techniques previously disclosed or described in conjunction with earlier figures. At process block 840, cells of the model of the production environment that are at least partially within the field of view are identified and loaded.

A context to be applied to items in the field of view is obtained at process block 850. For example, context can be related to a user's role in the production environment comprising position, certifications, security level, and/or time of day. Processing of the method 800 continues at process block 860 where the obtained context is applied to the items in the field of view. At process block 870, the identified objects are rendered for viewing in a three-dimensional graphical user interface according to context-sensitive parameters. Processing of the method 800 concludes at END block 880.

Figure 9:
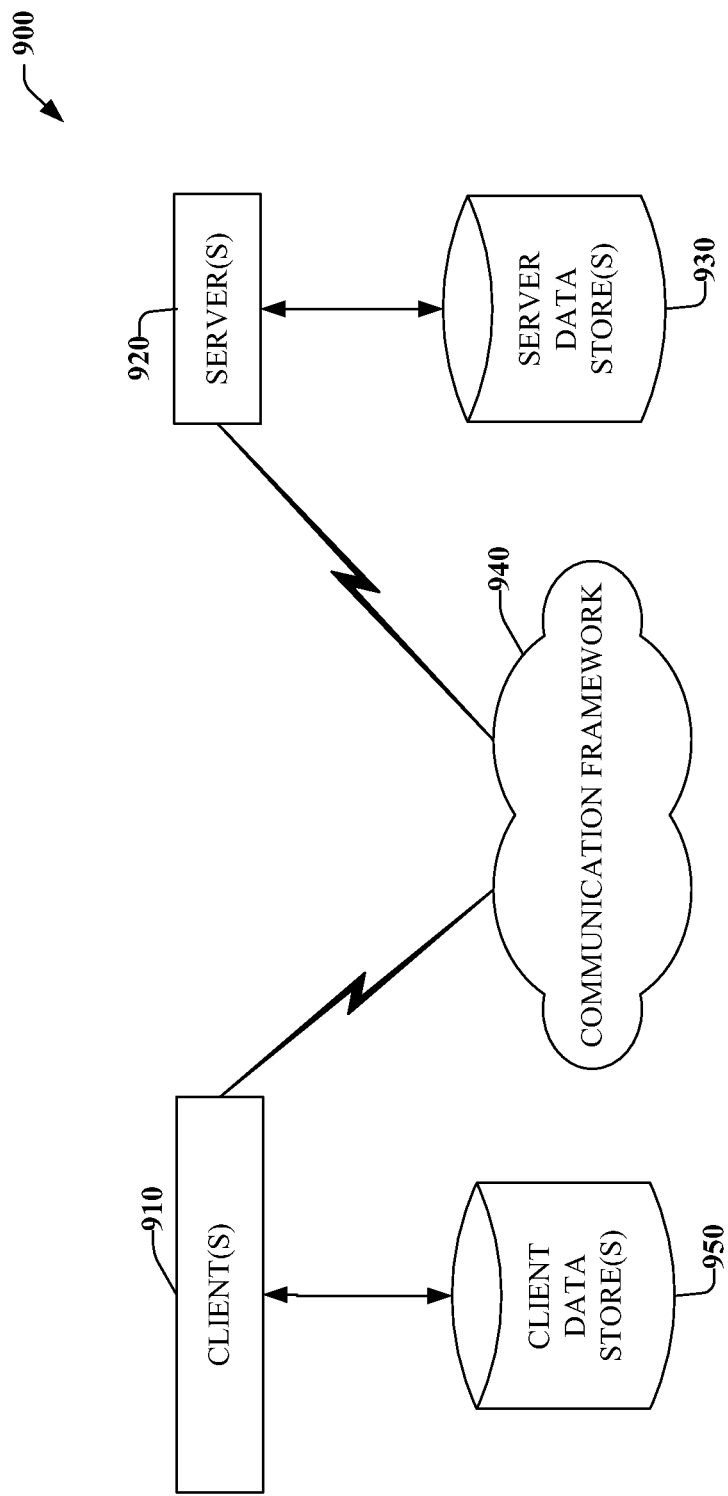
FIG. 9 illustrates an exemplary networking environment.
Figure 10:
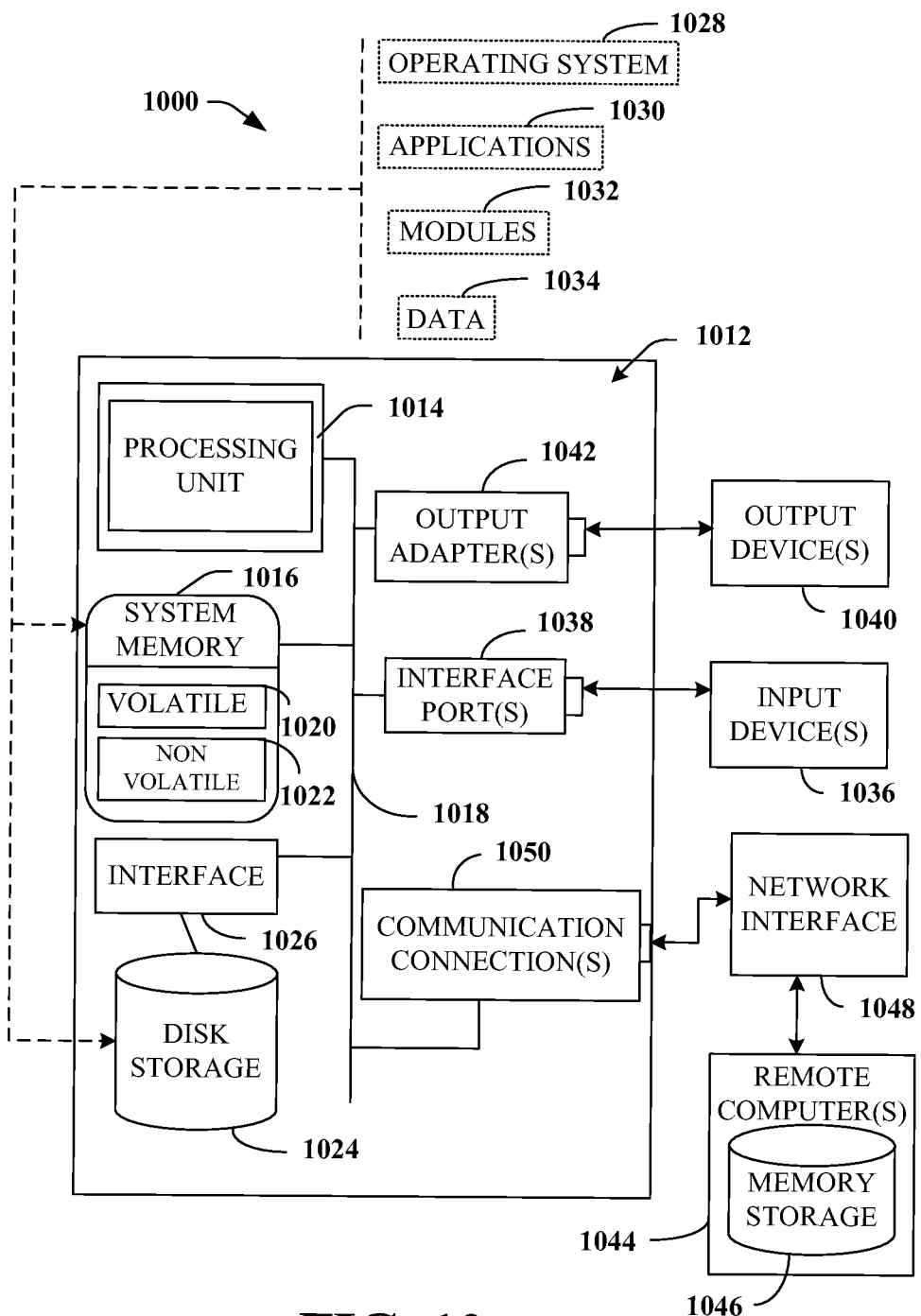
FIG. 10 illustrates an exemplary computing environment.

In order to provide additional context for implementation, FIGS. 9-10 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads or processes to perform transformations by employing the subject invention, for example.

One possible means of communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. For example, FIG. 10 illustrates a disk storage 1024. The disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. The operating system 1028, which can be stored on the disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. The input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method, comprising:
    receiving, by a system including at least one processor, reference point data including a reference point related to a location in an industrial automation environment;
    rendering, by the system, a representation of an object within a field of view of the industrial automation environment, wherein the field of view is determined based on the reference point and context information related to a role of a user in the industrial automation environment; and
    displaying, by the system, at least one of data and metadata associated with the object as a textual representation with the representation of the field of view.

2. The method of claim 1, further comprising:
    rendering, by the system, a representation of a second object within the field of view; and
    displaying, by the system, at least one of second data and second metadata associated with the second object as a textual representation with the representation of the field of view.

3. The method of claim 1, wherein the rendering further comprises rendering a cell of a model of the industrial automation environment based on the reference point.

4. The method of claim 1, wherein the at least one of data and metadata is associated with an operating condition of the object.

5. The method of claim 1, wherein the object is a machine.

6. A device, comprising:
    a memory that stores computer-executable components; and
    a processor, communicatively coupled to the memory, that facilitates execution of the computer-executable components to at least:
    receive data including a reference point relative to a location in an industrial automation environment;
    calculate a field of view based on the reference point;
    render a representation of the field of view of the industrial automation system; and
    display at least one of data and metadata associated with the representation as a textual description with the representation.

7. The device of claim 6, wherein the device is a mobile device.

8. The device of claim 7, wherein the location is a physical location of the mobile device.

9. The device of claim 6, further comprising an interface configured to display the representation.

10. The device of claim 6, wherein the representation comprises a graphical representation of a first machine and the at least one of data and metadata is displayed as a textual description of the first machine.

11. The device of claim 10, wherein the representation comprises a graphical representation of a second machine and the at least one of data and metadata is displayed as a textual description of the second machine.

12. The device of claim 6, wherein the at least one of data and metadata is related to the location.

13. The device of claim 6, wherein the location is a logical location.

14. The device of claim 6, wherein the processor further facilitates the execution to render the representation of the field of view based on a context related to a user.

15. The device of claim 14, wherein the context is based on a role of the user within the industrial automation environment.

16. The device of claim 14, wherein the context is based on a current time.

17. The device of claim 14, wherein the context is based on a role of the user within the industrial automation environment and a time.

18. The device of claim 6, wherein the field of view is rendered based on a first cell of a model of the industrial automation environment.

19. A non-transitory computer-readable storage medium having stored thereon computer-executable instructions that, in response to execution, cause a processor to perform operations, the operations comprising:
    receiving a reference point related to a location in an industrial automation environment;
    determining a field of view of the industrial automation environment based on the location:
    rendering a graphical representation of the field of view filtered based on context information related to a user; and
    displaying at least one of data and metadata associated with the field of view as text associated with the graphical representation of the field of view.

20. The non-transitory computer-readable storage medium of claim 19, wherein the graphical representation comprises a graphical representation of a machine and the at least one of data and metadata is related to the machine.

* * * * *